United States Patent [19]

Roberts et al.

[11] 4,195,745
[45] Apr. 1, 1980

[54] THERMALLY SENSITIVE PRESSURE RELEASE ASSEMBLY FOR SEALED PRESSURIZED VESSEL

[75] Inventors: Roy D. Roberts, Newark; Gordon R. Lavering, Belmont, both of Calif.

[73] Assignee: The United States of America as represented by the Secretary of the Army, Washington, D.C.

[21] Appl. No.: 877,215

[22] Filed: Feb. 13, 1978

[51] Int. Cl.² .............................................. H01K 3/22
[52] U.S. Cl. .................................. 220/2.2; 220/89 B; 137/68 R
[58] Field of Search ................ 220/89 R, 89 A, 89 B, 220/2.2; 137/68-74

[56] References Cited
U.S. PATENT DOCUMENTS

| | | | |
|---|---|---|---|
| 1,973,182 | 9/1934 | Shaw | 220/89 B |
| 2,947,443 | 8/1960 | Sawyer et al. | 220/89 A |
| 2,954,897 | 10/1960 | Hansen et al. | 220/89 A |
| 3,184,097 | 5/1965 | Kilmer et al. | 220/89 A |
| 3,269,402 | 8/1960 | Horner | 220/89 B |
| 3,906,976 | 9/1975 | Nohr et al. | 220/89 B |

FOREIGN PATENT DOCUMENTS 708882  5/1954  United Kingdom ................... 220/89 B

*Primary Examiner*—Joseph Man-Fu Moy
*Attorney, Agent, or Firm*—Nathan Edelberg; Sheldon Kanars; Michael C. Sachs

[57] ABSTRACT

A pressure release assembly provides controlled depressurization of a sealed gas-containing vessel, such as a xenon-filled arc lamp, when the temperature of the gas in the vessel reaches a value corresponding to a selected pressure. The assembly comprises a thin metallic rupture plate that hermetically seals an aperture in a wall of the vessel, and a back-up disc that is supported adjacent the other surface of the rupture plate. The back-up disc reinforces the rupture plate so as to prevent bursting of the rupture plate at pressures below the selected pressure. The back-up disc is made of a material that loses its tensile strength at the temperature corresponding to the selected pressure, whereby the weakening of the back-up disc at the selected pressure causes the rupture plate to burst. The back-up plate may be made of a eutectic alloy that melts at the temperature corresponding to the selected pressure.

25 Claims, 3 Drawing Figures

THERMALLY SENSITIVE PRESSURE RELEASE ASSEMBLY FOR SEALED PRESSURIZED VESSEL

BACKGROUND OF THE INVENTION

In a sealed gas-filled vessel such as a xenon arc lamp, an aperture is provided through which the vessel can depressurize in a predictable manner when a selected internal pressure is reached, e.g., as might occur in an arc lamp if the cooling mechanism fails.

In the prior art, scribed membranes (similar to the rupture plates used on large boilers) were used to seal pressure release apertures even on relatively small pressurized vessels such as arc lamps. In principle, the membrane would rupture along the scribed mark if the pressure within the vessel were to exceed a predetermined value. However, with scribed membrane rupture plates known to the prior art, the actual rupture pressure could not readily be predetermined with great accuracy especially for rupture plates of small diameter.

Another technique known to the prior art was to braze a metal slug or pin into a pressure release aperture drilled in the wall of the pressurized vessel, with the brazing material being chosen to melt at a temperature corresponding to a predetermined release pressure. However, with the thermally sensitive brazed slug technique of the prior art, the slug would frequently be propelled at high velocity outward from the wall of the vessel when the brazing material melted, thereby creating a possibility of damage to adjacent equipment and injury to personnel in the vicinity. Also, use of a brazing material that would permit release of the slug at a predetermined pressure precluded the use of certain manufacturing techniques (such as high-temperature oven bakeout) requiring that the vessel be heated to a temperature higher than the temperature corresponding to the predetermined slug release pressure.

SUMMARY OF THE INVENTION

It is an object of this invention to provide a thermally sensitive pressure release assembly for depressurizing a sealed gas-containing vessel.

It is a more particular object of this invention to provide a thermally sensitive pressure release assembly for depressurizing a sealed gas-containing vessel when the temperature of the gas in the vessel reaches a value corresponding to a predetermined pressure. In a particular application of this invention, the sealed pressurized vessel is a xenon-filled arc lamp.

More particularly, the pressure release assembly of this invention comprises a relatively thin metallic rupture plate that hermetically seals an aperture in a wall of the vessel and a back-up disc that is supported adjacent the outer (i.e., low pressure) surface of the rupture plate. The back-up disc reinforces the rupture plate so as to prevent bursting of the rupture plate at pressures below a selected pressure. Depending upon the kind of material from which the rupture plate is made and also upon its thickness, the rupture plate might be quite rigid for certain applications and might be a thin foil for other applications. A rigid rupture plate might advantageously be scribed in certain applications. The back-up disc is made of a material that loses its tensile strength, and thereby loses its strength as a support structure, at a temperature corresponding to the pressure selected for controlled depressurization of the vessel.

With particular application to xenon-filled arc lamps, wherein operating pressures are typically in the range from 150 to 450 psi, and wherein controlled depressurization is usually desirable whenever the internal pressure exceeds 550 psi, the rupture plate may be a nickel plate of 0.0015-inch thickness that is brazed to the periphery of the aperture through which depressurization is to occur. The back-up disc for such a nickel rupture plate may advantageously be made of a gold-germanium eutectic alloy that melts at 356° C. For a typical xenon arc lamp, the melting point for this alloy corresponds to an internal gas pressure of 550 psi. For any particular application, the back-up disc is made of a material that is chosen because its melting point corresponds to the pressure selected as the threshold for depressurization of the vessel.

The thickness of the back-up disc is sufficient to prevent bursting, bending or buckling of the rupture plate at pressures below the selected pressure. The temperature and pressure of the gas in the vessel are directly proportional. Thus, when the temperature rises to a value corresponding to the selected pressure, the back-up disc melts thereby allowing the nickel plate to rupture. Any fragments that might be created by the rupturing of the nickel plate would be immediately captured by the melted eutectic material. In this way, depressurization of the vessel can occur at a predetermined pressure without high-velocity fragments or a slug being propelled from the pressure release assembly.

DESCRIPTION OF PREFERRED EMBODIMENT

Figure 1:
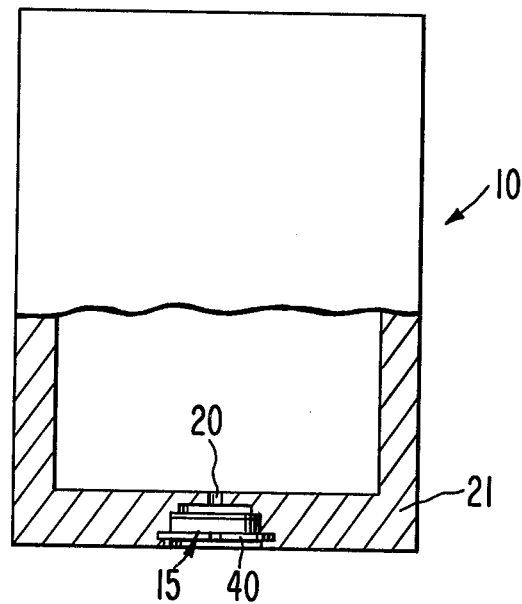
FIG. 1 shows in partial cross section a schematic representation of a pressurized vessel having a thermally sensitive pressure release assembly according to this invention.

FIG. 1 shows schematically a pressurized gas-filled vessel 10 in which an aperture 20 in a wall 21 thereof is closed and hermetically sealed by a thermally sensitive pressure release assembly 15, which bursts to provide a controlled depressurization of the vessel 10 when the internal pressure reaches a predetermined value.

Figure 2:
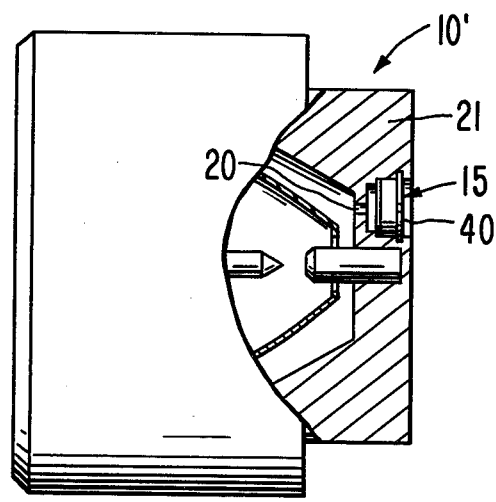
FIG. 2 shows in partial cross section a gas-filled arc lamp having a thermally sensitive pressure release assembly according to this invention.

FIG. 2 shows schematically a particular kind of gas-filled vessel (viz., a pressurized xenon-filled arc lamp 10' such as the lamp described in U.S. Pat. No. 3,970,883, assigned to Varian Associates, Inc.), which can advantageously be provided with a pressure release assembly 15 according to this invention.

Figure 3:
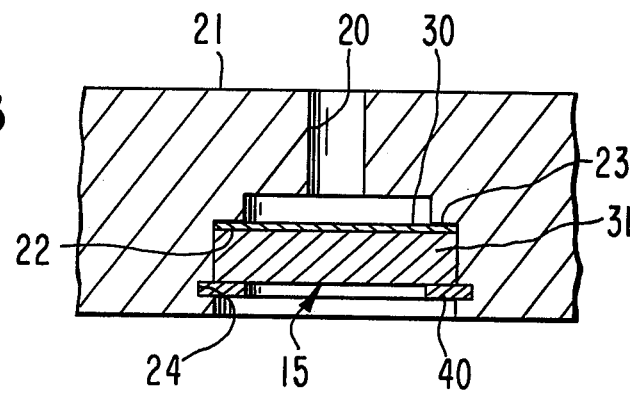
FIG. 3 is a cross-sectional view of a thermally sensitive pressure release assembly according to this invention.

In FIG. 3, a cross-sectional view of the thermally sensitive pressure release assembly 15 of this invention is shown. The pressure release assembly 15 closes and hermetically seals an aperture 20 through the wall 21 of the pressurized vessel. In a typical case, the wall 21 is made of stainless steel. As shown in FIG. 3, the aperture 20 is a bore through the wall 21, within which bore a ledge 22 configured to be normal to the axis of the bore is provided. The assembly 15 comprises a relatively thin metallic rupture plate 30 that is brazed to the ledge 22, and a thicker back-up disc 31 that is supported adjacent the outer (i.e., low pressure) surface of the rupture plate 30. The brazing joint between the rupture plate 30 and the ledge 22 may be made by using a brazing ring 23.

The back-up disc 31 reinforces the rupture plate 30 to prevent bursting, bending or buckling thereof at pressures below the predetermined release pressure. As shown in FIG. 3, the back-up disc 31 is retained tightly in place against the rupture plate 30 by a split retaining ring 40 that occupies a groove 24 in the interior of the bore forming the aperture 20.

The temperature of the assembly 15 is a monotonically varying function of the pressure within the sealed gas-filled vessel 10. In order to accomplish the objects of this invention, the rupture plate 30 is made of a material that is solid at the temperature corresponding to the predetermined release pressure. Likewise, the brazing ring 23 for bonding the rupture plate 30 to the ledge 22 is made of a material that remains solid at the temperature corresponding to the desired blow-out pressure. The thickness of the rupture plate 30, however, is not sufficient to enable the plate 30 by itself to withstand the outwardly directed force due to the pressure of the gas in the vessel 10, because the rupture plate 30 is reinforced by the back-up disc 31 to prevent bursting, bending or buckling of the rupture plate 30 at pressures below the predetermined release pressure.

The back-up disc 31 is made of a material, usually a eutectic alloy, that retains its tensile strength at temperatures below the temperature corresponding to the selected release pressure, but which melts at a temperature corresponding to the selected release pressure. The weakening of the back-up disc 31 at the selected release pressure causes the hermetically sealed rupture plate 30 to burst due to the pressure of the gas in the interior of the vessel 10. This controlled bursting or rupturing of the rupture plate 30 provides a thermally sensitive depressurization of the vessel 10, because such depressurization can occur only at a predetermined temperature corresponding to the predetermined release pressure. Such thermally controlled depressurization of a gas-containing vessel is much more precise than the pressure release technique provided by scribed membranes as in the prior art.

In accordance with the present invention, any fragments that may be formed by the bursting of the rupture plate 30 would pass into the liquid material of the melted back-up disc 31 at the predetermined release pressure. In this way, fragments of the rupture plate 30 are prevented from being projected at high velocity from the vessel 10. Where appropriate within the design constraints of the system in which the vessel 10 functions, a baffle plate or line-of-sight shield (not shown in the drawing) may be provided to collect resolidified particles of the back-up disc 31 that form after depressurization of the vessel 10 has occurred.

In the particular case of an arc lamp as shown in FIG. 2, in which the wall 21 is preferably made of stainless steel, a suitable material for the rupture plate 30 is nickel. For a nickel plate of 0.375-inch diameter, a thickness of 0.0015-inch is quite satisfactory. The nickel rupture plate 30 can be brazed to the ledge 22 of the stainless steel wall 21 by inserting a Cusil (28% copper-72% silver) brazing ring 23 between the ledge 22 and the rupture plate 30 and heating to a temperature above 779° C. Xenon arc lamps are typically operated at an internal pressure of 450 psi. A release pressure of 550 psi would be suitable for most arc lamp uses; and the temperature corresponding to the release pressure in a volume of gas typically contained in a xenon arc lamp is in the neighborhood of 360° C. For a release pressure of 550 psi, therefore, a suitable material for the back-up disc 31 is a gold-germanium eutectic (88% gold-12% germanium) alloy, which melts at 356° C.

Nickel is a particularly satisfactory material for the rupture plate 30 because nickel brazes well to stainless steel, and because the vapor pressure of nickel is sufficiently low to prevent significant out-gassing at high temperatures, e.g., during bake-out. Also, the tensile properties of nickel are such that a 0.0015-inch plate will not fail to burst due to the pressure of the gas in the lamp at 360° C. However, for particular applications, a metallic foil of any material that is non-reactive with respect to the gas or gases being confined within the sealed vessel 10 might be suitable.

The main limitation on the kind of material that can be used for the back-up disc 31 is that the material melt at a temperature corresponding to the selected release pressure. The thickness of the back-up disc 31 must be sufficient to prevent bursting of the adjacent rupture plate 30 at pressures below the selected release pressure.

The retaining ring 40 may be of the commercially available variety, such as one of the types of C-rings manufactured by PIC Design Corporation, Van Nuys, Calif.

A significant advantage of the pressure release assembly of the present invention lies in the fact that bake-out of the vessel 10 could be accomplished at any temperature below the temperature required for brazing the rupture plate 30 to the vessel wall 21 and above the melting point of the back-up disc 31. The hermetic seal that closes the aperture 20 would not be broken during bake-out. After the bake-out procedure, the back-up disc 31 would be inserted to reinforce the rupture plate 30 before the vessel 10 is filled with high-pressure gas.

A thermally sensitive pressure release assembly for providing controlled depressurization of a high-pressure gas-filled vessel has been described above in terms of particular materials suitable for particular applications. However, it will be recognized by those skilled in the art, after reading the disclosure herein, that other materials and configurations may be utilized for applying this invention to particular applications. Such use of other materials and configurations lies within the scope of this invention, which is defined by the following claims.

What is claimed is:

1. A method for fabricating an assembly for sealing a pressure release aperture in a wall of a sealed vessel for containing a gas under pressure, said assembly enabling controlled depressurization of said vessel through said aperture at a selected pressure, said method comprising the steps of:

(a) affixing a rupture plate to said wall to hermetically seal said aperture, and thereafter (b) positioning a solid back-up disc adjacent said rupture plate to reinforce said rupture plate so as to prevent bursting of said rupture plate at pressures in said vessel below said selected pressure, said back-up disc being made of a material that melts at a temperature corresponding to said selected pressure, whereby said back-up disc ceases to reinforce said rupture plate when said gas in said vessel attains said temperature corresponding to said selected pressure, the thickness of said rupture plate being such that said rupture plate, when not reinforced, bursts at said selected pressure, said back-up disc being arranged such that the presence of the liquid material of the melted back-up disc impedes the escape of fragments created by the rupturing plate and thereby slows their escaping velocity.

2. The method of claim 1 wherein said step of affixing said rupture plate to said wall includes brazing said rupture plate to said wall along the periphery of said aperture.

3. The method of claim 2 wherein said brazing of said rupture plate to said wall includes using a brazing material that remains solid at said temperature corresponding to said selected pressure.

4. The method of claim 2 wherein said brazing of said rupture plate to said wall includes brazing said rupture plate to a generally planar ledge formed within a bore through said wall, said bore defining said aperture.

5. The method of claim 1 wherein said step of positioning said back-up disc adjacent said rupture plate includes mechanically supporting said back-up disc adjacent said rupture plate.

6. The method of claim 4 wherein said step of positioning said back-up disc adjacent said rupture plate includes positioning said back-up disc so that said rupture plate remains generally parallel to said ledge at pressures below said selected pressure.

7. The method of claim 6 wherein said back-up disc is mechanically supported adjacent said rupture plate by a retaining ring that bears against said vessel.

8. The method of claim 1 wherein said back-up disc is made of a material that melts at said temperature corresponding to said selected pressure.

9. In combination, a sealed vessel for containing a gas under pressure, a bore through a wall of said vessel providing an aperture through which said gas can leave said vessel with the pressure of said gas in said vessel reaches a selected value, said bore being configured to have an annular ledge therein, and a pressure release assembly that hermetically seals said aperture at pressures below said selected value, said assembly comprising a rupture plate affixed to said annular ledge and a back-up disc positioned adjacent said rupture plate, said back-up disc serving to reinforce said rupture plate so as to prevent bursting of said rupture plate at pressures below said selected value due to the pressure of said gas in said vessel, said back-up disc being made of material that melts at a temperature corresponding to said selected value for the pressure in said vessel, whereby said back-up disc ceases to reinforce said rupture plate when the pressure of said gas in said vessel attains said selected value, the dimensions of said rupture plate being such that said rupture plate, when not reinforced, bursts at said selected value for the pressure in said vessel, said back-up disc being arranged such that the presence of the liquid material of the melted back-up disc impedes the escape of fragments created by the rupturing plate and thereby slows their escaping velocity.

10. The combination of claim 9 wherein said rupture plate is affixed to said wall of said vessel by a braze joint along the periphery of said aperture.

11. The combination of claim 10 wherein said braze joint is formed by a brazing material that remains solid at said temperature corresponding to said selected value for the pressure in said vessel.

12. The combination of claim 9 wherein said back-up disc is positioned adjacent said rupture plate by a mechanical supporting means.

13. The combination of 9 wherein said annular ledge is generally planar, and said back-up disc is positioned adjacent said rupture plate by a mechanical supporting means, whereby said back-up disc causes said rupture plate to remain generally parallel to said ledge at pressures below said selected value.

14. The combination of claim 13 wherein said mechanical supporting means comprises a retaining ring that bears against a surface of said bore.

15. The combination of claim 9 wherein said back-up disc is made of a material that melts at said temperature corresponding to said selected value for the pressure in said vessel.

16. An arc lamp comprising a sealed envelope for confining a gas under pressure, said envelope having a bore therethrough, said bore providing an aperture through which said gas can leave said envelope when the pressure in said envelope reaches a selected value, said bore being configured to have an annular ledge therein, said aperture being hermetically sealed at pressures below said selected value by a pressure release assembly comprising:

a rupture plate that is affixed to said annular ledge within said bore, and a back-up disc that reinforces said rupture plate at pressures below said selected value so as to prevent bursting of said rupture plate at pressures below said selected value, said back-up disc being made of a material that melts at a temperature corresponding to said selected value for the pressure in said envelope, whereby said back-up disc ceases to reinforce said rupture plate when the pressure of said gas attains said selected value, the dimensions of said rupture plate being such that said rupture plate, when not reinforced, bursts at said selected value for the pressure in said envelope, said back-up disc being arranged such that the presence of the liquid material of the melted back-up disc impedes the escape of fragments created by the rupturing plate and thereby slows their escaping velocity.

17. The arc lamp of claim 16 wherein said rupture plate is affixed to said annular ledge within said bore by a braze joint.

18. The arc lamp of claim 17 wherein said braze joint is formed by a brazing material that remains solid at said temperature corresponding to said selected value for the pressure in said envelope.

19. The arc lamp of claim 16 wherein said back-up disc is positioned adjacent said rupture plate by a mechanical supporting means.

20. The arc lamp of claim 19 wherein said mechanical supporting means comprises a split retaining ring positioned in a groove in said bore.

21. The arc lamp of claim 16 wherein said back-up disc is made of a material that melts at said temperature corresponding to said selected value for the pressure in said envelope.

22. The arc lamp of claim 16 wherein said rupture plate is made of nickel.

23. The arc lamp of claim 22 wherein said nickel rupture plate is affixed to said annular ledge by a braze joint.

24. The arc lamp of claim 23 wherein said braze joint is provided by a copper-silver brazing ring.

25. The arc lamp of claim 16 wherein said back-up disc is made of a gold-germanium eutectic alloy.

* * * * *